April 10, 1934.  G. H. HUNT  1,954,528
BRAKE OPERATING MECHANISM
Filed June 27, 1932
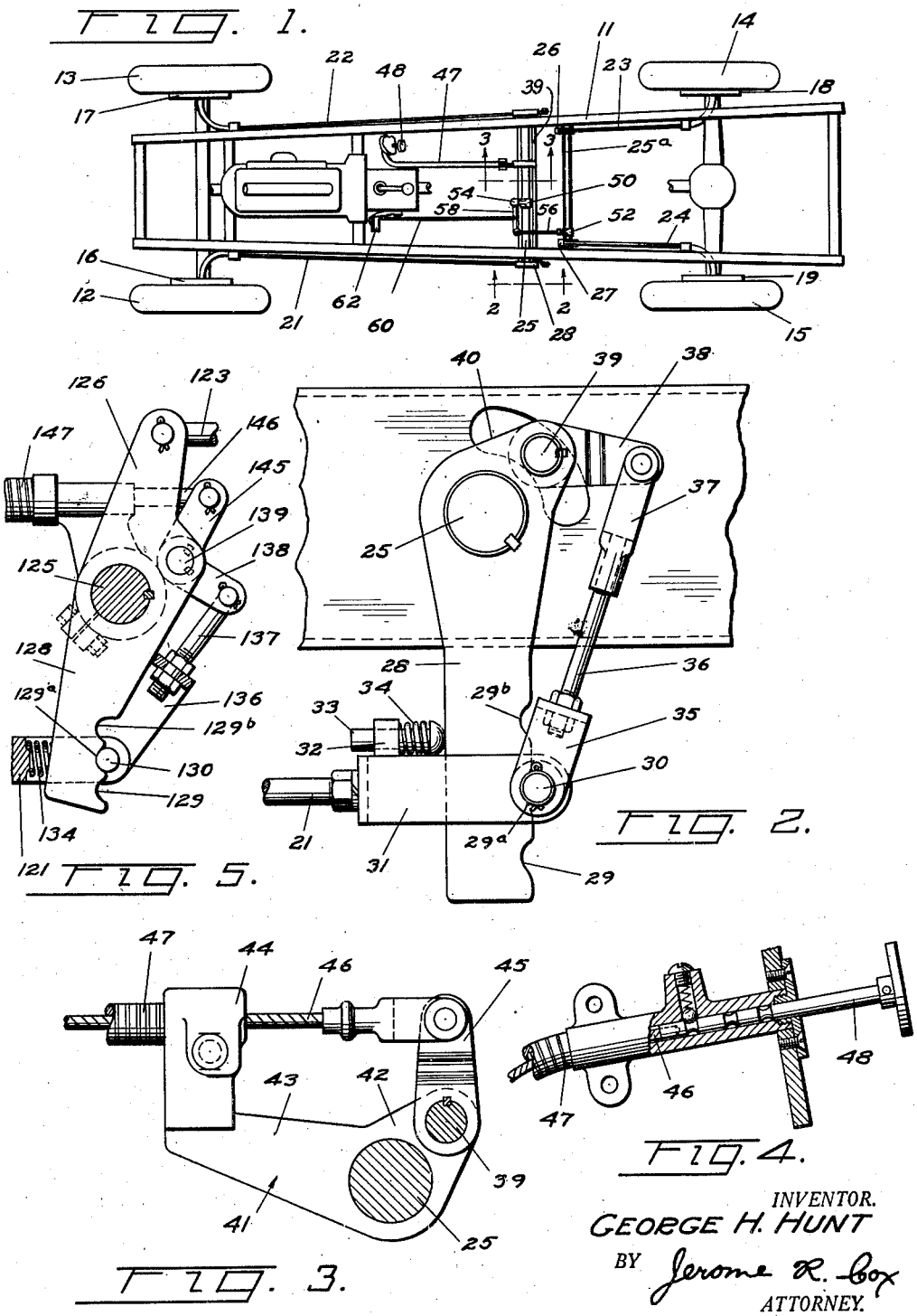
INVENTOR.
GEORGE H. HUNT
BY Jerome R. Cox
ATTORNEY.

Patented Apr. 10, 1934

1,954,528

UNITED STATES PATENT OFFICE 1,954,528

BRAKE OPERATING MECHANISM

George H. Hunt, South Bend, Ind., assignor to Bendix Aviation Corporation, South Bend, Ind., a corporation of Delaware Application June 27, 1932, Serial No. 619,608

8 Claims. (Cl. 188—10)

This invention relates to brakes and more particularly to brakes for vehicles which are subject to material variations of the load.

Many vehicles, such as trucks, are at times driven with a larger portion of the load at the front end of the vehicle and are at other times driven with a larger portion of the load at the rear end of the vehicle. It is advantageous that the brakes at the respective ends should be applied in greater or lesser degrees according to the portion of the load carried by the respective front or rear wheels.

One of the objects of this invention is to provide means for varying the braking effort exerted upon the various wheels of a vehicle so that the brake may be applied in accordance with the load carried by the various wheels.

A further object of the invention is to provide means under the control of the operator for selectively increasing or decreasing the proportion of braking effort exerted upon the front wheels or upon the rear wheels of an automobile.

One of the features of the invention is a novel structure for varying the leverage of the linkage by which the brakes on the front wheels are applied while maintaining the leverage acting on the rear wheels substantially constant.

Further objects and features of the invention will be apparent from a reading of the specification and claims and after a consideration of the attached drawing in which:

Figure 1 is a more or less diagrammatic plan view of an automobile equipped with a braking system constructed according to my invention;

Figure 2 is an enlarged fragmentary view in side elevation taken substantially on the line 2—2 of Figure 1;

Figure 3 is an enlarged sectional view which shows a fragment of the operating mechanism and which is taken substantially on the line 3—3 of Figure 1;

Figure 4 is an enlarged view partially in elevation and partially in section showing another fragment of the operating mechanism; and Figure 5 is a fragmentary view in elevation showing a modified form of shaft and lever corresponding in function to the shaft and the lever shown in Figures 2 and 3.

Referring to the drawing, I have shown an automobile having a frame 11 and equipped with wheels 12, 13, 14, and 15. The wheels have brakes 16, 17, 18, and 19 respectively and the brakes are controlled by tension elements 21, 22, 23, and 24 respectively. The tension elements 21 and 22 are operated by means of a cross shaft 25 which carries downwardly extending arms such as 28 connected to the elements 21 and 22. The tension elements 23 and 24 are operated by means of a cross shaft 25a which carries upwardly extending arms 26 and 27 connected to the elements 23 and 24 respectively.

The arms 28 are attached to the outer ends of shaft 25 and inasmuch as both are similar, description of one should be sufficient for both. Each of these arms is formed on its rear side with a plurality of notches such as 29, 29a, and 29b. Slidably embracing the arm 28 is a yoke 31 which is secured to the tension member 21 and which carries a pin 30 adapted to be selectively disposed in any one of the notches 29, 29a, or 29b. The yoke 31 also carries an upstanding lug 32 through which a plunger 33 extends. The plunger 33 is resiliently pressed into contact with the arm 28 by means of a spring 34 which thus holds the yoke resiliently forward relative to the arm 28. Thus the pin 33 is resiliently maintained in the selected notch 29, 29a, or 29b.

The pin or roller 30 is carried by a yoke 35 which is positioned outside of the yoke 31 and which is connected through links 36 and 37 to a lever 38, the latter being secured to an auxiliary shaft 39. The auxiliary shaft 39 is mounted in bearings formed in an offset portion 40 of the arm 28 and thus moves coincidently with the shaft 25 about the axis of the shaft 25. However, the auxiliary shaft 39 may be rotated about its own axis independent of the motion of the shaft 25. By this rotation, the operator is able to raise or lower the pin or roller 30 and is thus able to change the effective leverage on the tension element 21.

The shaft 25 has also secured to it (see Fig. 3) a support element 41 formed with a bearing 42 through which the auxiliary shaft 39 extends and formed with a bracket arm 43 provided with a bracket 44. The auxiliary shaft 39 adjacent to the bearing 42 is formed with a lever 45. To the upper end of the lever 45 there is pivotally connected a cable 46 extending forward through the bracket 44 and thence forward through a flexible conduit 47 which is secured at its rear end to said bracket 44. The forward end of the conduit 47 is secured at a point convenient to the operator on the frame 11 of the automobile. The forward end of the cable 46 is provided with a handle 48 by means of which a pull or push may be exerted upon the cable to cause movement thereof relative to the conduit 47.

Means are provided to rotate the shafts 25 and 25a. Each carries an operating arm such as the arms 50 and 52. Links 54 and 56 pivotally connected to the arms 50 and 52 are at their opposite ends connected to an equalizer bar 58. The equalizer bar 58 is connected by a link 60 with a pedal 62.

It is to be understood that the effective lengths of arms 28 when the pins 30 are in the notches 29a bear the same proportion to the length of arm 50 as the lengths of arms 26 and 27 bear to the length of arm 52.

In the operation of the brakes of a vehicle equipped with brake mechanism constructed according to the above description, the operator presses upon the pedal 62 thus transmitting force to the bar 58. The force is then divided equally by the bar 58 and equal portions thereof are transmitted to the shaft 25 and 25a. Assuming that the pin 30 is located in the notch 29a, equal brake applying force is transmitted from the shaft 25 to the front brakes through the tension elements 21 and 22 and from the shaft 25a to the rear brakes through the tension elements 23 and 24. However, should the operator desire to increase the proportion of the braking force which is applied to the front wheels, he pulls upon the handle 48. Should he desire to increase the proportion of the braking effort which is applied to the rear wheels, he presses upon the handle 48. Movement of the cable 46 forward relative to the conduit 47 rotates the auxiliary shaft 39 and thus raises the pin 30. The movement upward of the pin 30 increases the leverage upon the tension elements 21 and 22 and thus increases the proportion of the braking applying force which is exerted upon the front wheels of the automobile. Reverse movement of the handle 48 lowers the pin 30 and decreases the portion of the brake applying force transmitted to the front brakes. The weight of the tension elements 21 and 22 and the yoke 31 aids in the downward movement thereof.

In Figure 5 there is shown a non-equalized system. Therein, the cross-shaft 125 carries upwardly extending arms such as 126 and downwardly extending arms such as 128. Each arm 126 has pivotally connected thereto a tension element such as 123 and each downwardly extending arm 128 has associated therewith a tension element such as 121. Each of the latter tension elements carries a pin 130 adapted to fit in one of the notches 129, 129a, or 129b and adapted to be resiliently maintained in position by a spring 134. The position of the pin 130 is controlled by links 136 and 137 and by a lever 138, a shaft 139, a lever 145, and a cable 146 operating in a conduit 147, in a manner similar to that described above in connection with the form shown in Figs. 1-4 incl. It is to be understood that the lengths of arms 126 equal the effective lengths of arms 128 when the pin 130 is in the notch 129a.

It is believed that the operation of this embodiment will be clear from the above. Depression of the pedal operates through suitable linkage to rotate the cross-shaft 125 and thus exerts a pull upon the tension elements 121 and 123. If the pins 130 are in the notches 129a the movements of the elements 121 and 123 are equal and the brakes are applied substantially equally. However, if the pins 130 are moved to the notches 129 the elements 121 are moved a greater distance than the elements 123 and the front brakes are applied sooner and due to the fact that they are applied sooner and the fact that the system is not equalized are applied with greater force than the rear brakes. If the pins 130 are moved into the notches 129b the rear brakes are applied sooner and due to the fact that they are applied sooner and the fact that the system is not equalized are applied with greater force than the front brakes.

It may be seen that I have provided a simple, efficient device for use with an automotive vehicle by means of which the driver may at will vary the proportion of the braking force which is applied to the front wheels relative to that which is applied to the rear wheels of an automotive vehicle. This structure is advantageous for varying the braking effort applied to the various wheels in accordance with the load carried by the various wheels. It is also advantageous for use in controlling the braking of the vehicle upon slippery streets as it is then desirable to vary the proportion of the braking effort applied to the front wheels relative to the effort applied to the rear wheels from the proportion normally most desirable.

It is to be understood that the above described embodiments of my invention are for the purpose of illustration only, and various changes may be made therein without departing from the spirit and scope of the invention.

I claim:

1. For an automotive vehicle having front wheels and rear wheels; brakes for said front wheels; brakes for said rear wheels; a foot pedal; and means comprising connections between said foot pedal and said rear wheels and connections between said foot pedal and said front wheels for transmitting braking force to said brakes and for varying the proportion of the pedal force which is transmitted to one of said sets of brakes, said connections including a lever having a fixed pivot, a link connected to said lever, and means for varying the effective position at which said link is connected to said lever.

2. In braking apparatus, a cross shaft, a lever secured to said cross shaft, a link associated with said lever, a yoke attached to said link and contacting with said lever, an arm pivoted upon said lever, and a strut connecting said arm and said yoke.

3. In a braking apparatus, a cross shaft, arms mounted on said cross shaft, a tension element associated with each of said arms, a yoke slidably mounted on each of said arms and secured to the associated tension member, and means for moving each of said yokes relative to its associated arm.

4. In a braking apparatus, a cross shaft, an arm mounted on said cross shaft, a tension element associated with said arm, a yoke slidably mounted on said arm and secured to said tension member, and means for moving said yoke relative to said arm, said means comprising a lever pivotally mounted upon said arm, a link connecting said lever and said yoke, and mechanism for rotating said lever.

5. In a braking apparatus, a cross shaft, an arm mounted on said cross shaft, a tension element associated with said arm, a yoke slidably mounted on said arm and secured to said tension member, and means for moving said yoke relative to said arm, said means comprising a lever pivotally mounted upon said arm, a link connecting said lever and said yoke, and a flexible cable and conduit having their opposite ends located conveniently to the driver of the automobile for rotating said lever.

6. In a braking apparatus, a cross shaft, an arm mounted on said cross shaft, a tension element associated with said arm, a yoke slidably mounted on said arm and secured to the associated tension member, and means for moving said yoke relative to said arm.

7. In braking apparatus for an automotive vehicle having a dashboard, of front brakes, a set of rear brakes, a cross shaft, a plurality of arms secured to said shaft and extending upwardly therefrom, a plurality of arms secured to said shaft and extending downwardly therefrom, connections between said upwardly extending arms and one said set of brakes, connections between said downwardly extending arms and said other set of brakes, and means for varying the effective point of attachment of one of said sets of connections to its associated arms, said means comprising a cable extending from a point adjacent to said shaft to a point adjacent the dashboard.

8. In braking apparatus a lever secured on a fixed pivot, a brake pedal connected thereto, a brake, a brake pull rod connected thereto, a pin extending through said pull rod and contacting with said lever and thus connecting the rod to the lever, a link attached to said pin for moving it longitudinally of said lever, and means for moving said link whereby the connection between the lever and the pull rod may be moved longitudinally of the lever to vary the leverage ratio between said brake pedal and said brake.

GEORGE H. HUNT.